United States Patent
Takaoka (10) Patent No.: US 10,255,010 B2
(45) Date of Patent: Apr. 9, 2019

(54) IMAGE FORMING SYSTEM

(71) Applicant: KYOCERA Document Solutions Inc., Osaka-shi, Osaka (JP)

(72) Inventor: Toshimasa Takaoka, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 7 days.

(21) Appl. No.: 15/827,399

(22) Filed: Nov. 30, 2017

(65) Prior Publication Data

US 2018/0157448 A1 Jun. 7, 2018

(30) Foreign Application Priority Data

Dec. 2, 2016 (JP) .................................. 2016-234736

(51) Int. Cl.
*G06F 3/12* (2006.01)
*G06K 19/07* (2006.01)

(52) U.S. Cl.
CPC .......... *G06F 3/1238* (2013.01); *G06F 3/1204* (2013.01); *G06F 3/126* (2013.01); *G06F 3/1222* (2013.01); *G06K 19/0723* (2013.01)

(58) Field of Classification Search
CPC .... G06F 3/1238; G06F 3/1204; G06F 3/1222; G06F 3/126; G06K 19/0723
See application file for complete search history.

(56) References Cited

U.S. PATENT DOCUMENTS

2016/0127584 A1* 5/2016 Kubota .............. H04N 1/00408
358/1.15
2016/0253136 A1* 9/2016 Adachi ................. G06F 3/1238
358/1.14

FOREIGN PATENT DOCUMENTS

JP 2013190934 A 9/2013
JP 2015088080 A 5/2015

* cited by examiner

*Primary Examiner* — Quang N Vo
(74) *Attorney, Agent, or Firm* — Alleman Hall Creasman & Tuttle LLP (57) ABSTRACT

An image forming system includes an image forming apparatus and a management server. The image forming apparatus reads a surface image of an ID card, outputs a copy print including the ID card surface image and address information that indicates an address in a management domain managed by the management server, and transmits card copy information including the ID card surface image and the address information to the management server together with a registration request. The management server receives the registration request and the card copy information, stores the ID card surface image and the address information in the card copy information, into a predetermined storage device in association with each other, receives a browsing request, and identifies address information included in the browsing request, and transmits a surface image of an ID card associated with the identified address information, to a transmission source of the browsing request.

5 Claims, 7 Drawing Sheets

IMAGE FORMING SYSTEM

INCORPORATION BY REFERENCE

This application is based upon and claims the benefit of priority from the corresponding Japanese Patent Application No. 2016-234736 filed on Dec. 2, 2016, the entire contents of which are incorporated herein by reference.

BACKGROUND

The present disclosure relates to an image forming system.

In recent years, an IC chip is embedded in an ID card so as to prevent the ID card from being forged, wherein in the IC chip, attribute information of the owner of the ID card is written, for example.

On the other hand, there is known an authentication system for obtaining a face image of a person by a camera and identifying the person by using the obtained face image in order to prevent impersonation.

There is also known an image forming apparatus that includes an ID card copying function which is used to copy an ID card. The ID card copying function generates a print by copying an image of an ID card to a print sheet. In application of various types of services, a copy print of an ID card may be requested by a service provider for the identification of the applicant.

To generate the copy print of the image of the ID card, an image forming apparatus installed in a convenience store or the like for use by a large number of unspecified users, may be used.

SUMMARY

An image forming system according to an aspect of the present disclosure includes an image forming apparatus and a management server that are connected to a network. The image forming apparatus (a) reads a surface image of an ID card, (b) outputs a copy print that includes the surface image of the ID card and address information that indicates an address in a management domain managed by the management server, and (c) transmits card copy information to the management server via the network together with a registration request, the card copy information including the surface image of the ID card and the address information. The management server (a) receives the registration request and the card copy information via the network, (b) stores the surface image of the ID card and the address information included in the card copy information, into a predetermined storage device in association with each other, (c) receives a browsing request via the network, and (d) identifies address information included in the browsing request, and transmits a surface image of an ID card associated with the identified address information, to a transmission source of the browsing request via the network.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings.

Figure 1:
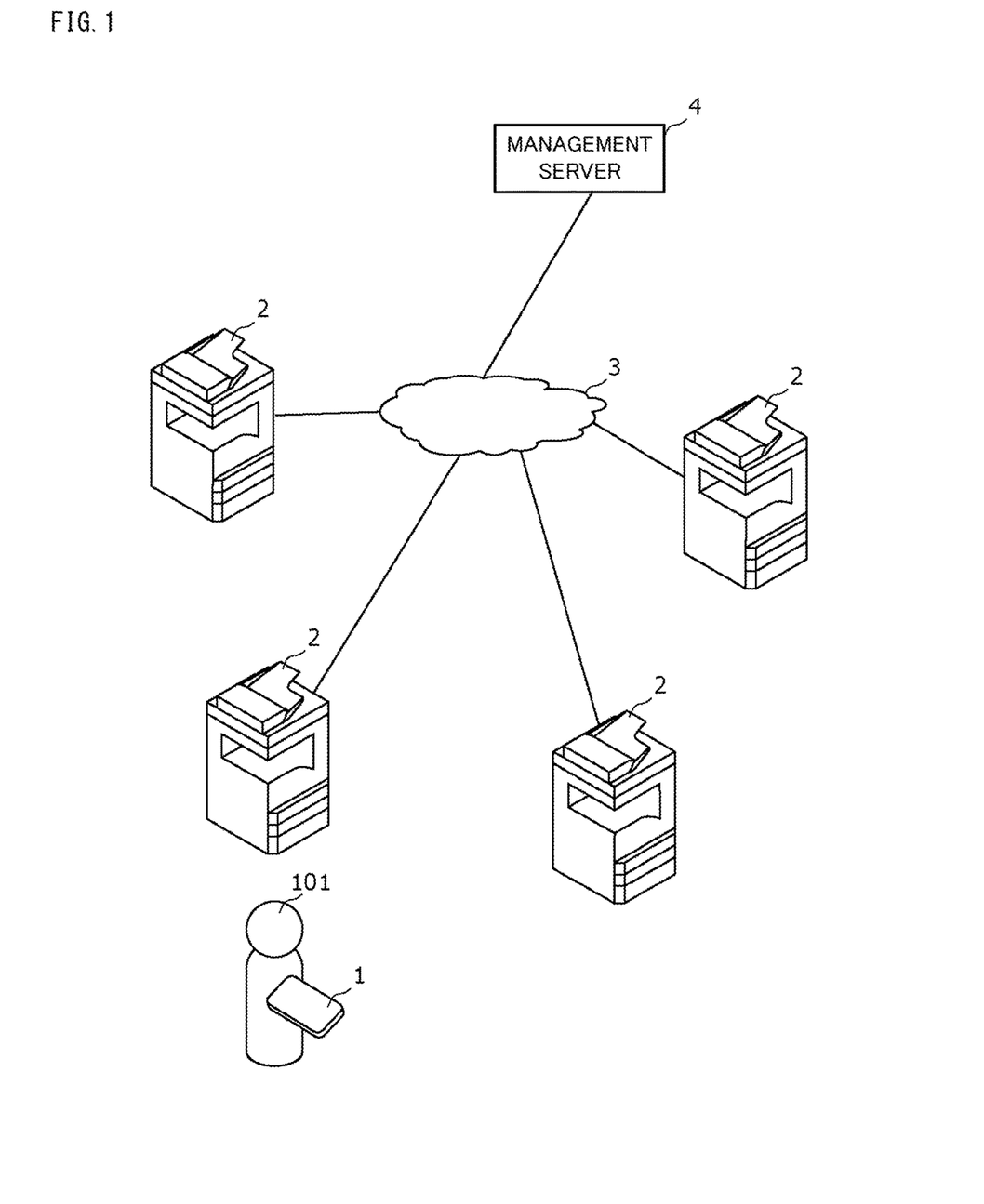
FIG. 1 is a block diagram showing a configuration an image forming system according to an embodiment of the present disclosure.

FIG. 1 is a block diagram showing a configuration of an image forming system according to an embodiment of the present disclosure. In the system shown in FIG. 1, a user 101 has an ID card 1 of himself/herself, and a plurality of image forming apparatuses 2 (multifunction peripherals, copiers or the like) are installed at a plurality of separate locations such as convenience stores.

The image forming apparatuses 2 are connected to a network 3. Furthermore, a management server 4 is connected to the network 3. The network 3 is a wide-area network such as the Internet, and a setting is made so that data communications can be made between the image forming apparatuses 2 and the management server 4 via the network 3.

Figure 2:
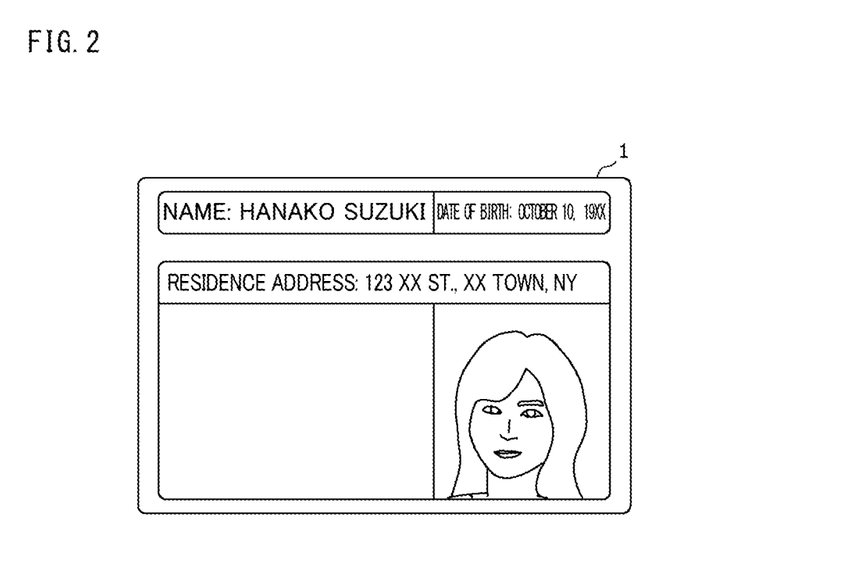
FIG. 2 is a front view of an ID card 1 showing an example of an outer appearance of the ID card 1 shown in FIG. 1.
Figure 3:
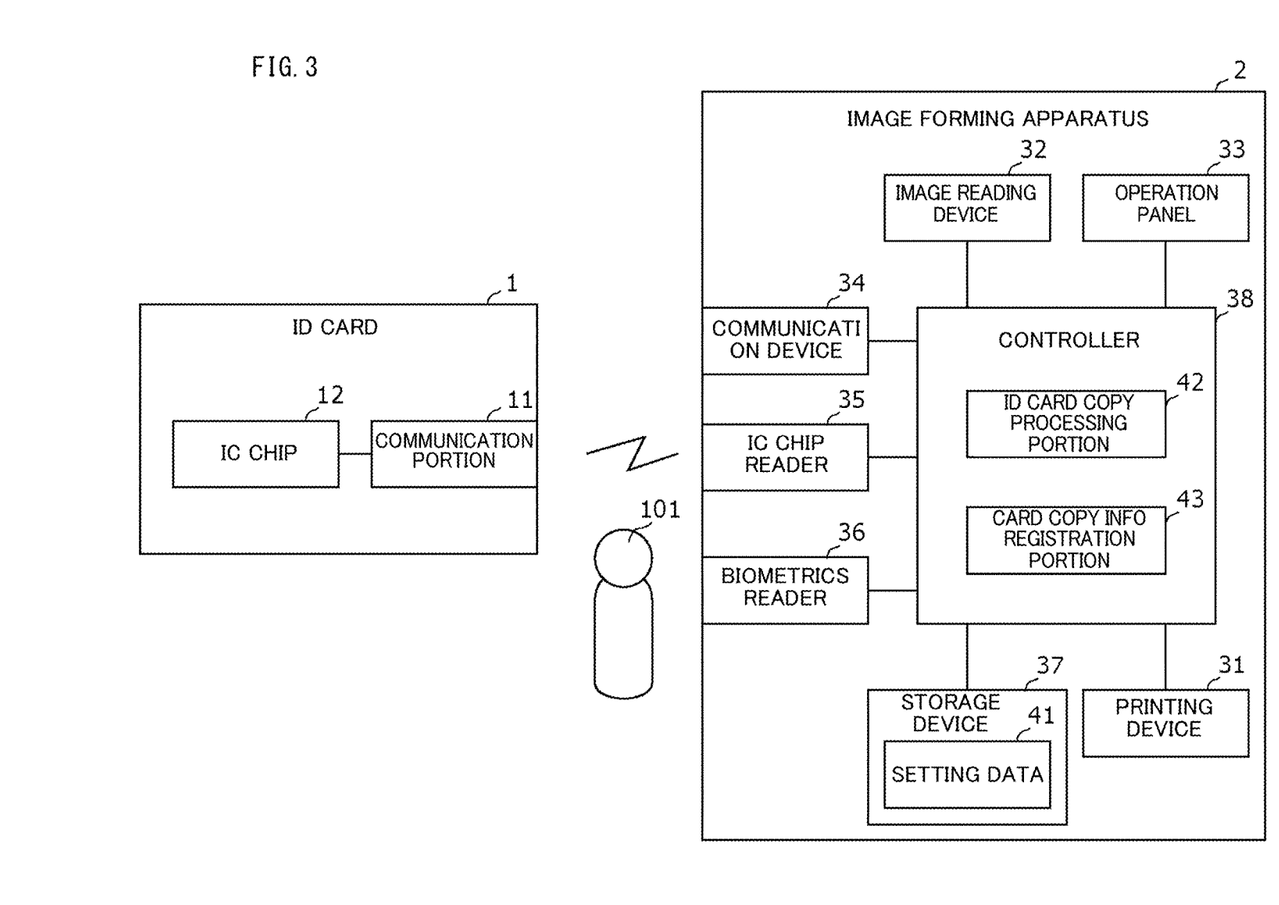
FIG. 3 is a block diagram showing a configuration of the ID card 1 and image forming apparatuses 2 shown in FIG. 1.

FIG. 2 is a front view of the ID card 1 showing an example of an outer appearance of the ID card 1 shown in FIG. 1. FIG. 3 is a block diagram showing a configuration of the ID card 1 and each of the image forming apparatuses 2 shown in FIG. 1.

As shown in FIG. 2, attribute information is printed on a surface of the ID card 1, wherein the attribute information includes a name, a residence address, and a face photograph.

In addition, as shown in FIG. 3, in the ID card 1, a communication portion 11 and an IC chip 12 are embedded, wherein the communication portion 11 is, for example, an antenna, the IC chip 12 is, for example, a FeliCa™ chip, and attribute information (an example of the first attribute information of the present disclosure) of the owner (the user 101) is stored in the IC chip 12. The attribute information includes a name, a residence address, an ID code (for example, an employee number), and biometrics information (for example, face authentication information, fingerprint authentication information or the like).

On the other hand, as shown in FIG. 3, each of the image forming apparatuses 2 includes a printing device 31, an image reading device 32, an operation panel 33, a communication device 34, an IC chip reader 35, a biometrics reader 36, a storage device 37, and a controller 38.

The printing device 31 is an internal device configured to print, by an electrophotographic system, images onto print sheets page by page based on image data for the printing.

The image reading device 32 is an internal device configured to read a document sheet image from a document sheet, and generates image data (namely scan data) of the document sheet image.

The operation panel 33 includes a display device and an input device, wherein the display device is disposed on a surface of a housing of the image forming apparatus 2, and displays various types of information to the user 101, and the input device receives a user operation. For example, a liquid crystal display is used as the display device. A key switch, a touchpanel or the like is used as the input device.

The communication device 34 is, for example, a network interface connected to the network 3, and is an internal device configured to perform a data communication with the management server 4 or the like.

The IC chip reader 35 performs a data communication with the ID card 1 when it is in a vicinity of the IC chip reader 35, and reads various types of data from the IC chip 12 of the ID card 1.

The biometrics reader 36 is, for example, a camera for face authentication or a fingerprint scanner, and obtains biometrics information of the user 101.

The storage device 37 is a nonvolatile storage device such as a flash memory or a hard disk, and stores setting data 41 and the like.

The controller 38 includes a computer, an ASIC (Application Specific Integrated Circuit) or the like, and controls the internal devices of the image forming apparatus 2. The controller 38 operates as an ID card copy processing portion 42 and a card copy information registration portion 43 as the computer executes programs.

Each of the image forming apparatuses 2 has an ID card verified copying function. When the operation panel 33 receives a user operation for selecting an ID card copying mode, the controller 38 executes the ID card verified copying function and outputs a copy print of a surface image of the ID card 1.

The ID card copy processing portion 42 (a) reads the surface image of the ID card 1 by using the image reading device 32, and (b) outputs, by using the printing device 31, a copy print that includes the read surface image of the ID card 1 and address information (for example, a URL (Uniform Resource Locator)) that indicates an address in a management domain managed by the management server 4.

After the ID card copy processing portion 42 completes an output of a copy print, the card copy information registration portion 43 (c) transmits card copy information to the management server 4 via the network 3 together with a registration request, wherein the card copy information includes the surface image of the ID card 1, and the address information. It is noted that the card copy information may include, for example, card identification information of the ID card 1 and the attribute information read from the IC chip 12 of the ID card 1.

Figure 4:
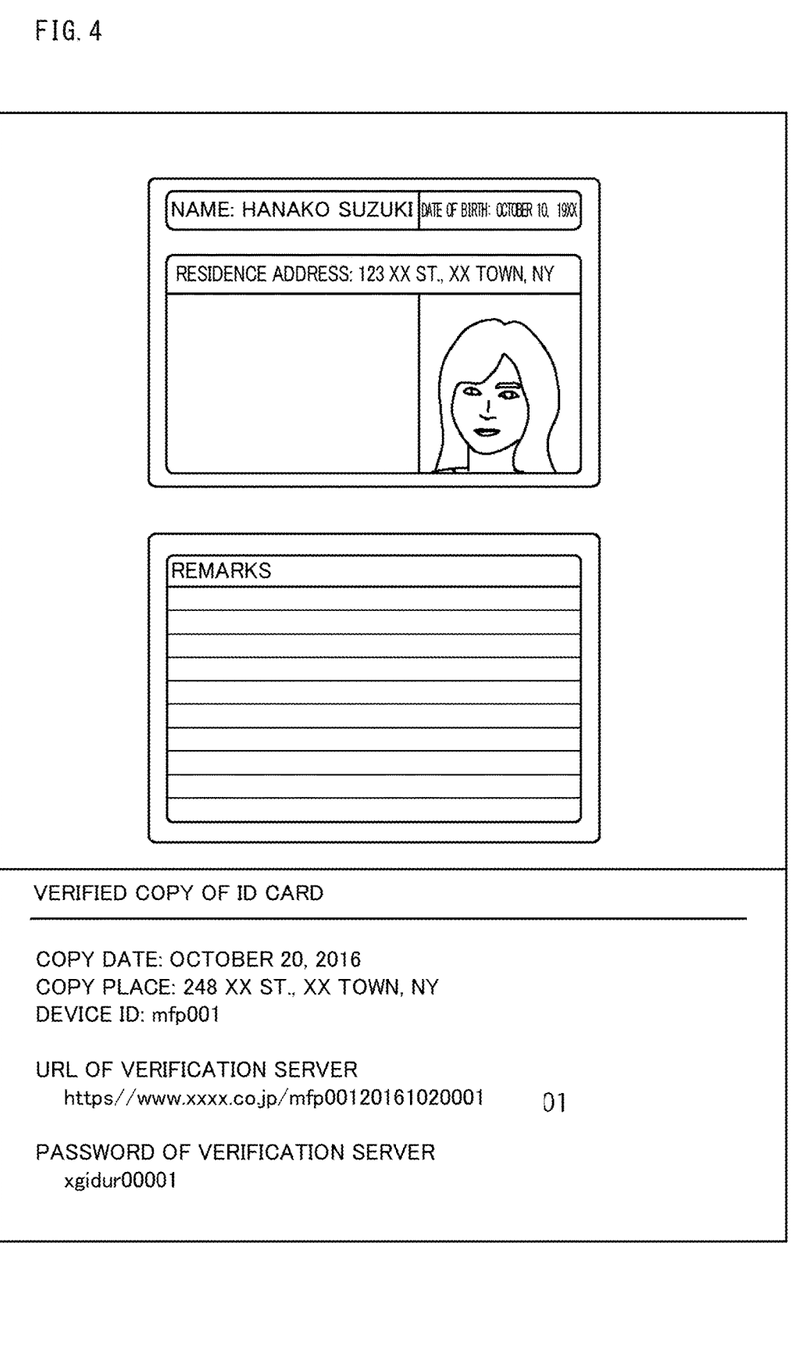
FIG. 4 is a diagram showing an example of a copy print output by the image forming apparatuses 2 shown in FIG. 1 and FIG. 2.

FIG. 4 shows an example of a copy print output from any of the image forming apparatuses 2 shown in FIG. 1 and FIG. 2. As shown in FIG. 4, the copy print includes, for example, images of both sides of the ID card 1, a date on which the copy print was generated, a location at which the copy print was generated, a device ID of the image forming apparatus 2 that generated the copy print, and address information (in FIG. 4, a URL) and a password that are used to browse the card copy information that is registered in correspondence with the copy print. These pieces of information are transmitted as the card copy information, to the management server 4.

Furthermore, in the present embodiment, the ID card copy processing portion 42 determines whether to permit or reject an output of a copy print based on a predetermined condition. It is noted that when a copy print is output, the card copy information is registered, and when a copy print is not output, the card copy information is not registered, either.

For example, the ID card copy processing portion 42 (d) reads attribute information (the first attribute information) of the owner (the user 101) of the ID card 1 from the IC chip 12 embedded in the ID card 1, (e) extracts attribute information (the second attribute information) of the owner from the surface image of the ID card 1 by using the character recognition technology or the like, (0 determines whether to permit or reject an output of a copy print based on a result of comparison between the attribute information read from the IC chip 12 and the attribute information extracted from the ID card surface image, and (g) outputs the copy print when it determines to permit an output of the copy print, and prohibits the output of the copy print and does not output the copy print when it determines not to permit an output of the copy print.

In addition, for example, the ID card copy processing portion 42 obtains biometrics information of the user 101 by using the biometrics reader 36, determines whether to permit or reject an output of a copy print based on a result of comparison between the obtained biometrics information and biometrics information that is contained in the attribute information read from the IC chip 12, and outputs the copy print when it determines to permit an output of the copy print, and prohibits the output of the copy print and does not output the copy print when it determines not to permit an output of the copy print.

In addition, for example, the ID card copy processing portion 42 determines whether to permit or reject an output of a copy print based on residence address information (extracted from the ID card surface image or read from the IC chip 12) of the owner of the ID card 1, and outputs the copy print when it determines to permit an output of the copy print, and prohibits the output of the copy print and does not output the copy print when it determines not to permit an output of the copy print.

For example, the setting data 41 includes a range of residence address based on which its associated image forming apparatus 2 determines whether or not to permit an output of a copy print. Specifically, the ID card copy processing portion 42 determines to permit an output of a copy print when the residence address information of the owner of the ID card 1 obtained from the ID card 1 is within the range of residence address indicated by the setting data 41, and otherwise, determines not to permit an output of a copy print.

Figure 5:
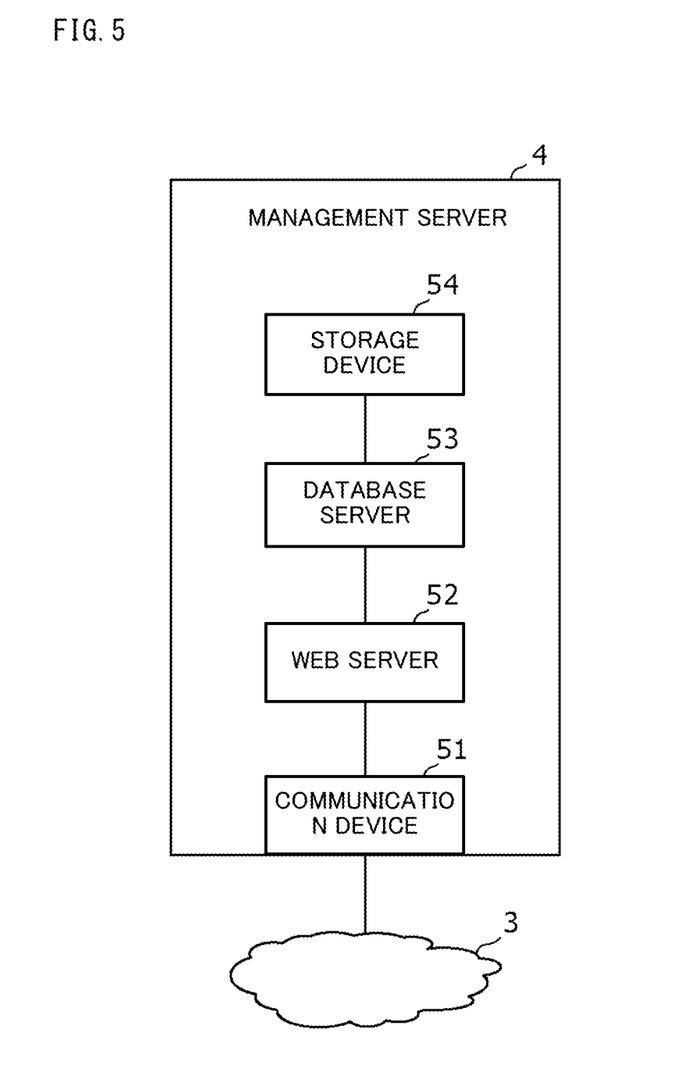
FIG. 5 is a block diagram showing a configuration of a management server 4 shown in FIG. 1.

FIG. 5 is a block diagram showing a configuration of the management server 4 shown in FIG. 1.

As shown in FIG. 5, the management server 4 includes a communication device 51, a web server 52, a database server 53, and a storage device 54.

The communication device 51 is, for example, a network interface connected to the network 3, and is an internal device configured to perform data communications with the image forming apparatuses 2 and the like.

The web server 52 is a front-end server that receives a registration request and a browsing request by using the communication device 51, wherein the registration request is transmitted from any of the image forming apparatuses 2 via the network 3, and the browsing request is transmitted via the network 3. The database server 53 constructs a database in the nonvolatile storage device 54. Upon receiving a registration request, the database server 53 registers card copy information in the database in accordance with the registration request, and upon receiving a browsing request, the database server 53 transmits, as a response, card copy information specified by the browsing request.

It is noted that the above-described web server 52 and database server 53 are realized as the computer executes a server program.

Specifically, when the web server 52 receives a registration request and card copy information via the network 3, the database server 53 stores the surface image of the ID card 1 and the address information included in the card copy information, into a database constructed in a predetermined storage device (in this example, the storage device 54) in association with each other.

Furthermore, when the web server 52 receives a browsing request via the network 3, the web server 52 identifies the address information included in the browsing request, and the database server 53 transmits a surface image of the ID card 1 that is associated with the identified address information, to a transmission source of the browsing request via the network 3.

In this example, the communication with the management server 4 is executed by HTTP (HyperText Transfer Protocol). However, the communication with the management server 4 may be executed by another protocol.

It is noted that in a case where, as described above, the image forming apparatus 2 determines whether to permit or reject an output of a copy print based on the residence address information, when a copy print cannot be output due to a failure, the image forming apparatus 2 transmits failure information to the management server 4. Upon receiving the failure information, if there is no image forming apparatus 2 other than the image forming apparatus 2 that transmitted the failure information, that permits an output of the copy print of the ID card 1 having a predetermined residence address of the owner (a residence address for which its associated image forming apparatus 2 permits an output of the copy print), the management server 4 transmits a permission command to an image forming apparatus 2 that is closest to the image forming apparatus 2 that transmitted the failure information, wherein the permission command temporarily permits an output of the copy print of the ID card 1 having the predetermined residence address of the owner. Upon receiving the permission command, the image forming apparatus 2 temporarily adds a range of residence address specified by the permission command, to the range of residence address specified by the setting data 41. For example, the management server 4 holds, in advance, registration data of each of the image forming apparatuses 2, wherein the registration data includes a location where the image forming apparatus 2 is installed, and a range of residence address for which the image forming apparatus 2 permits an output of a copy print. Based on the registration data, the management server 4 identifies the range of residence address for which the image forming apparatus 2 that transmitted the failure information permits an output of a copy print, and identifies the image forming apparatus 2 that is closest to the image forming apparatus 2 that transmitted the failure information. It is noted that when the failure is removed, the image forming apparatus 2 transmits restoration information to the management server 4, and the management server 4 transmits a cancellation command that cancels the permission command, to the image forming apparatus 2 to which the permission command had been transmitted.

Next, an operation of the image forming system according to the present embodiment is described.

(a) Operation of Image Forming Apparatus 2

Figure 6:
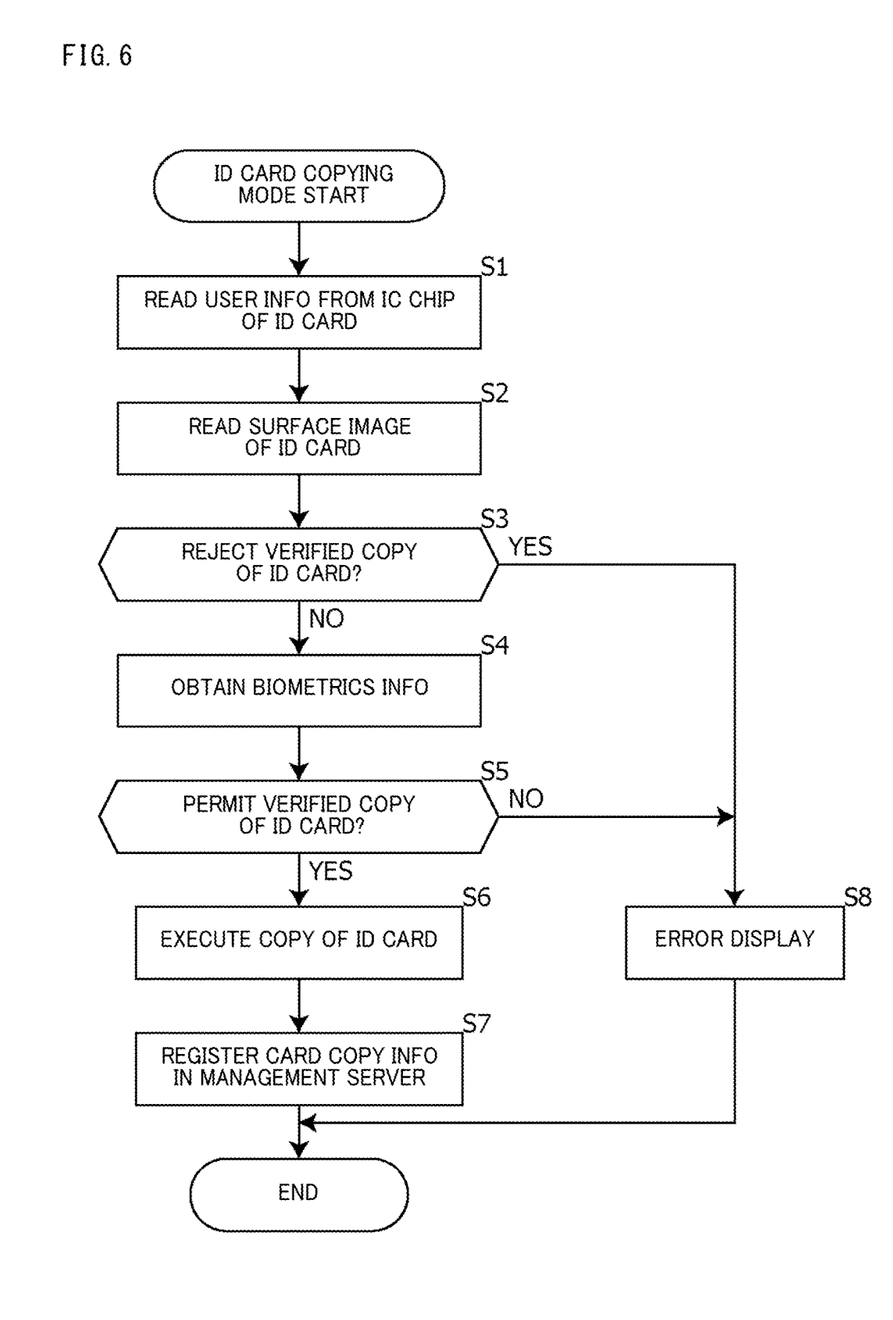
FIG. 6 is a flowchart for explaining an operation of each of the image forming apparatuses 2 shown in FIG. 1.

FIG. 6 is a flowchart for explaining an operation of each of the image forming apparatuses 2 shown in FIG. 1.

When the user 101 selects the ID card copying mode, the following process is executed.

When the user 101 places the ID card 1 in proximity to the IC chip reader 35, the ID card copy processing portion 42 reads attribute information from the IC chip 12 of the ID card 1 by using the IC chip reader 35 (step S1).

Subsequently, when the user 101 places the ID card 1 on the image reading device 32, the ID card copy processing portion 42 reads a surface image of the ID card 1 by using the image reading device 32 (step S2). It is noted that at this time, when reading an image of a side of the ID card 1 is completed, the user 101 turns the ID card 1 on the image reading device 32, and the ID card copy processing portion 42 reads a surface image of the other side of the ID card 1 by using the image reading device 32.

Next, the ID card copy processing portion 42 extracts attribute information (a name, a residence address and the like) from the read image, and determines whether or not the attribute information read from the IC chip 12 matches the attribute information extracted from the read image, and based on the determination result, determines whether or not to reject an output of the copy print of the ID card 1 (step S3).

When these attribute information match, the ID card copy processing portion 42 does not reject an output of the copy print of the ID card 1. The ID card copy processing portion 42 then obtains biometrics information of the user 101 by using the biometrics reader 36 (step S4), determines whether or not the biometrics information obtained by using the biometrics reader 36 matches the biometrics information contained in the attribute information obtained from the IC chip 12, and based on the determination result, determines whether or not to permit an output of the copy print of the ID card 1 (step S5).

When these pieces of biometrics information match, the ID card copy processing portion 42 permits an output of the copy print of the ID card 1. The ID card copy processing portion 42 then generates a URL and a password that are unique to the copy print that is output at this time, generates image data of the copy print that includes the URL, the password, and the image of the ID card 1, and causes the printing device 31 to output the copy print based on the generated image data (step S6).

When the output of the copy print is completed, the card copy information registration portion 43 uses the communication device 34 to transmit a registration request and card copy information including the surface image of the ID card 1 and the address information to the management server 4 via the network 3 (step S7).

On the other hand, when it has been determined in step S3 to reject an output of the copy print of the ID card 1, or when it has been determined in step S5 not to permit an output of the copy print of the ID card 1, the ID card copy processing portion 42 displays an error message on the operation panel 33 (step S8), and ends the process. As a result, in this case, an output of the copy print and registration of the card copy information are not performed.

(b) Operation of Management Server 4

Figure 7:
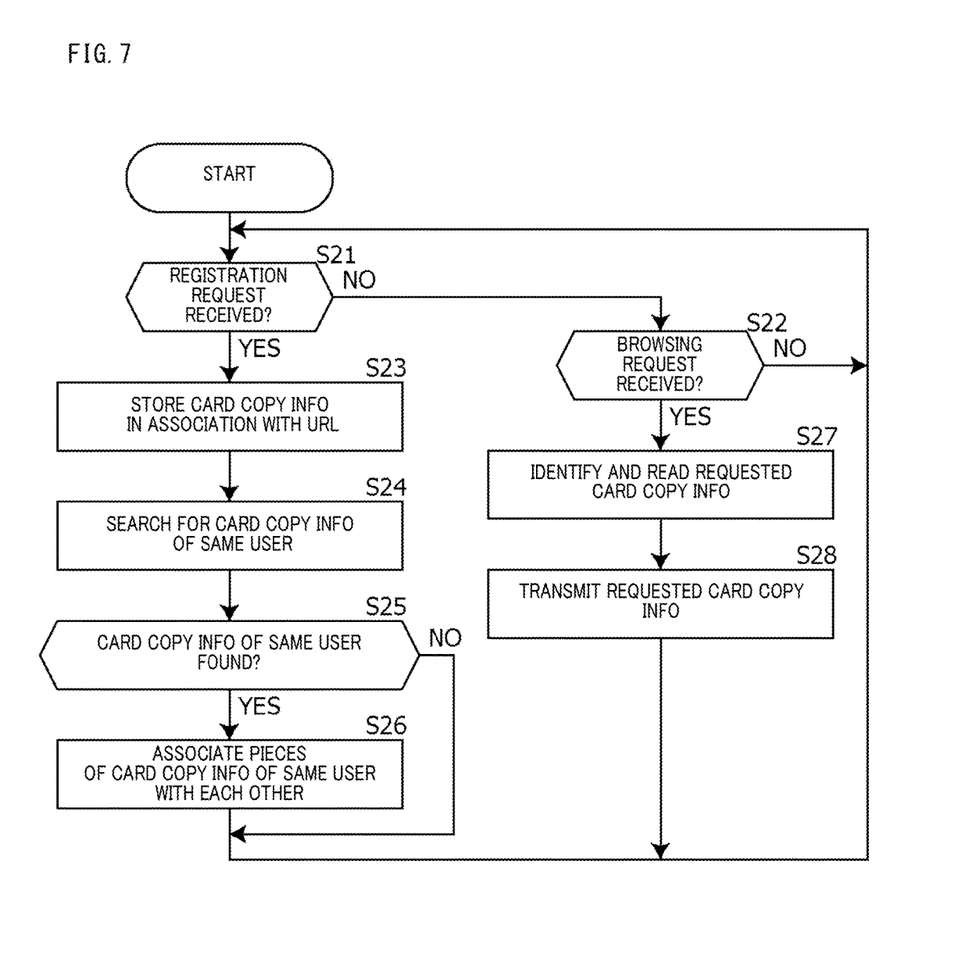
FIG. 7 is a flowchart for explaining an operation of the management server 4 shown in FIG. 1.

FIG. 7 is a flowchart for explaining an operation of the management server 4 shown in FIG. 1.

The web server 52 monitors whether or not the communication device 51 has received a registration request and a browsing request (steps S21 and S22).

When the web server 52 receives a registration request and card copy information from an image forming apparatus 2, the database server 53 first stores the card copy information in the database in a browsable manner, in association with address information (in this example, a URL) included in the card copy information (step S23).

Furthermore, the database server 53 identifies the user 101 based on the card copy information, and searches the database for another one or more pieces of card copy information that have been registered for the same user (step S24).

The database server 53 determines whether or not another one or more pieces of card copy information registered for the same user have been found in the database (step S25). When it determines that another one or more pieces of card copy information registered for the same user have been found in the database, the database server 53 adds the number of pieces of registered card copy information (namely, the number of times that the copy print has been output), and address information (in this example, URLs) of the other pieces of card copy information among a plurality of pieces of registered card copy information, to each of the plurality of pieces of registered card copy information (step S26). With this operation, the plurality of pieces of registered card copy information are associated with each other.

The card copy information registered in this way can be browsed by using a web browser or the like based on the URL and the password written in the copy print.

When the web server 52 receives a browsing request from a terminal apparatus (not shown), the database server 53 identifies a piece of card copy information specified by a URL included in the browsing request, and when a password included in the browsing request is an authorized one, reads the piece of card copy information (step S27), and transmits the piece of card copy information to the terminal apparatus as, for example, HTML (HyperText Markup Language) data (step S28).

Conventionally, although it has been difficult to forge the ID card 1 itself, it has been possible to forge a copy print of an image of the ID card 1. In addition, it has been possible for a person to read attribute information of the owner recorded in the IC chip 12 of the ID card 1 by using the IC chip reader 35 and have the person identified as the owner by using the read attribute information. Even in a case where the attribute information in the IC chip 12 is biometrics information such as the face image of the owner, a person (for example, a brother or a sister of the owner) who resembles the owner may succeed in the face authentication and use the ID card 1 in an unauthorized manner.

In the image forming system according to the embodiment of the present disclosure, as described above, a service provider who has received a copy print can browse a corresponding piece of card copy information by using a terminal apparatus connected to the network 3, and confirm whether or not the received copy print is a forged one or an altered one.

In addition, in a case where other pieces of card copy information have been registered for the same user, URLs of the other pieces of card copy information have been added to the browsed piece of card copy information. This makes it possible to browse the other pieces of card copy information based on the URLs, and browse the number of pieces of card copy information registered for the same user.

As described above, according to the present embodiment, the image forming apparatus 2 (a) reads the surface image of the ID card 1, (b) outputs a copy print that includes the read surface image of the ID card 1 and address information that indicates an address in a management domain managed by the management server 4, and (c) transmits card copy information to the management server 4 via the network 3 together with a registration request, wherein the card copy information includes the surface image of the ID card 1 and the address information. Upon reception of the registration request and the card copy information via the network 3, the management server 4 stores the surface image of the ID card 1 and the address information included in the card copy information, into the storage device 54 in association with each other, and upon reception of a browsing request via the network 3, the management server 4 identifies the address information included in the browsing request, and transmits the surface image of the ID card 1 associated with the identified address information, to a transmission source of the browsing request via the network 3. With this configuration, one who has received the copy print of the image of the ID card 1 can confirm that the copy print is not a forged one.

It is noted that various modifications and corrections that can be made to the present embodiment are apparent to one having ordinary skill in the art. Such modifications and corrections may be made within the objectives and scope of the subject concept and without reducing the intended advantages. That is, such modifications and corrections are intended to be included in the claims.

For example, in the present embodiment, in the management server 4, each user 101 is associated with a plurality of pieces of card copy information. However, not limited to this configuration, each ID card 1 may be associated with a plurality of pieces of card copy information. In this case, the other pieces of card copy information registered for the same ID card 1 can be browsed, and the number of registrations (namely, the number of times that the copy print has been output) can be browsed for each ID card 1.

In addition, in the present embodiment, the biometrics reader 36 is provided in each of the image forming apparatuses 2. However, not limited to this configuration, the biometrics reader 36 may be provided in a mobile terminal apparatus (for example, a smartphone) of the user 101, and the mobile terminal apparatus may be used to obtain the biometrics information of the user 101, and the obtained biometrics information may be transmitted to the image forming apparatus 2.

The present disclosure is applicable to an authentication of a copy print of an ID card which is for identification of the owner thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. An image forming system comprising:
an image forming apparatus connected to a network; and
a management server connected to the network, wherein
the image forming apparatus is configured to
read a surface image of an ID card, output a copy print that includes the surface image of the ID card and address information that indicates an address in a management domain managed by the management server, and transmit card copy information to the management server via the network together with a registration request, the card copy information including the surface image of the ID card and the address information, and the management server is configured to receive the registration request and the card copy information via the network, store the surface image of the ID card and the address information included in the card copy information, into a predetermined storage device in association with each other, receive a browsing request via the network, and identify address information included in the browsing request, and transmit a surface image of an ID card associated with the identified address information, to a transmission source of the browsing request via the network.

2. The image forming system according to claim 1, wherein the image forming apparatus is configured to read first attribute information of an owner of the ID card from an IC chip in the ID card, extract second attribute information of the owner from the surface image of the ID card, determine whether to permit or reject an output of the copy print based on a result of comparison between the first attribute information read from the IC chip and the second attribute information extracted from the surface image of the ID card, and upon determining to permit an output of the copy print, output the copy print and transmit the card copy information to the management server, and upon determining to reject an output of the copy print, prohibit the output of the copy print and prohibit the copy print from being transmitted to the management server.

3. The image forming system according to claim 2, wherein the first attribute information read from the IC chip in the ID card is biometrics information, and the image forming apparatus is configured to obtain biometrics information of a user, determine whether to permit or reject an output of the copy print based on a result of comparison between the obtained biometrics information and biometrics information read from the IC chip, and upon determining to permit an output of the copy print, output the copy print and transmit the card copy information to the management server, and upon determining to reject an output of the copy print, prohibit the output of the copy print and prohibits the copy print from being transmitted to the management server.

4. The image forming system according to claim 1, wherein the image forming apparatus is configured to determine whether to permit or reject an output of the copy print based on residence address information of an owner of the ID card, the residence address information being obtained from the ID card, and upon determining to permit an output of the copy print, output the copy print and transmit the card copy information to the management server, and upon determining to reject an output of the copy print, prohibit the output of the copy print and prohibits the copy print from being transmitted to the management server.

5. The image forming system according to claim 4, wherein the image forming apparatus is configured to transmit failure information to the management server when the copy print cannot be output due to a failure, and the management server is configured to upon reception of the failure information, when there is no image forming apparatus other than the image forming apparatus that transmitted the failure information, that permits an output of the copy print of the ID card having a predetermined residence address of the owner, transmit a permission command to an image forming apparatus that is closest to the image forming apparatus that transmitted the failure information, the permission command temporarily permitting an output of the copy print of the ID card having the predetermined residence address of the owner.

* * * * *